(12) United States Patent
Kim et al.

(10) Patent No.: US 12,139,079 B2
(45) Date of Patent: Nov. 12, 2024

(54) PIPE HARNESS WITH SEAL FIXED TO THE INTERIOR OF THE PIPE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Jisung Kim, Yokkaichi (JP); Hirotaka Baba, Yokkaichi (JP); Takeshi Shimizu, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 330 days.

(21) Appl. No.: 17/786,125

(22) PCT Filed: Nov. 27, 2020

(86) PCT No.: PCT/JP2020/044145
§ 371 (c)(1),
(2) Date: Jun. 16, 2022

(87) PCT Pub. No.: WO2021/124830
PCT Pub. Date: Jun. 24, 2021

(65) Prior Publication Data
US 2023/0017633 A1 Jan. 19, 2023

(30) Foreign Application Priority Data

Dec. 18, 2019 (JP) .................................. 2019-228260
Apr. 23, 2020 (JP) .................................. 2020-076621

(51) Int. Cl.
*B60R 16/02* (2006.01)
*H01R 13/52* (2006.01)

(52) U.S. Cl.
CPC ..... *B60R 16/0222* (2013.01); *H01R 13/5205* (2013.01)

(58) Field of Classification Search
CPC ........ B60R 16/0222; H01B 7/00; H02G 3/04; H01R 13/5205
See application file for complete search history.

(56) References Cited

U.S. PATENT DOCUMENTS

| 2015/0034382 | A1 | 2/2015 | Yoshida et al. |
| 2019/0393686 | A1 | 12/2019 | Hiromori |
| 2023/0083925 | A1* | 3/2023 | Takahashi ........... B60R 16/0215 174/77 R |

FOREIGN PATENT DOCUMENTS

| JP | 2007-157435 A | 6/2007 |
| JP | 2009-148072 A | 7/2009 |

OTHER PUBLICATIONS

Machine Translation JP 2007-157435, (Jun. 21, 2007) (Year: 2024).*
(Continued)

*Primary Examiner* — Travis S Chambers
(74) *Attorney, Agent, or Firm* — Oliff PLC (57) ABSTRACT

A pipe harness including an electric wire; a pipe through which the electric wire is inserted; a seal through which the electric wire is inserted, the seal being configured to ensure sealing of an interior of the pipe by being attached inside the pipe; and a position fixing portion that is provided on at least a pipe opening side of the seal out of two sides of the seal in a thickness direction of the seal when the seal is attached in the pipe, the position fixing portion being configured to fix the seal at an attachment position.

11 Claims, 6 Drawing Sheets

(56) References Cited

OTHER PUBLICATIONS

Machine Translation, JP 2009148072 (Jul. 2, 2009) (Year: 2024).*
Jan. 12, 2021 International Search Report issued in International Patent Application No. PCT/JP2020/044145.

* cited by examiner

PIPE HARNESS WITH SEAL FIXED TO THE INTERIOR OF THE PIPE

BACKGROUND

The present disclosure relates to a pipe harness.

Conventionally, JP 2013-223342A discloses a pipe harness formed by inserting an electric wire that constitutes a wire harness into a pipe. The reason why the electric wire is inserted into the pipe in this way is to protect the electric wire with the pipe when the electric wire is routed under the floor of a vehicle such as an automobile.

SUMMARY

With this type of pipe harness, a technique for sealing the pipe with a rubber stopper or the like has been proposed in order to ensure sealing performance to prevent the intrusion of water into the pipe. In this sealing structure, for example, a rubber stopper is attached to the pipe, and the electric wire is passed through a hole in the center of the rubber stopper. However, in the case of this sealing structure, a separate member such as a rubber stopper retainer is needed in order to fix the rubber stopper to the pipe and/or prevent the rubber stopper from coming out of the pipe, thus leading to the problems of an increase in the number of parts and an increase in cost.

An exemplary aspect of the disclosure provides a pipe harness that can have a simplified structure.

A pipe harness according to an aspect of the present disclosure includes: an electric wire; a pipe through which the electric wire is inserted; a seal through which the electric wire is inserted, the seal being configured to ensure sealing of an interior of the pipe by being attached inside the pipe; and a position fixing portion that is provided on at least a pipe opening side of the seal out of two sides of the seal in a thickness direction of the seal when the seal is attached in the pipe, the position fixing portion being configured to fix the seal at an attachment position.

A pipe harness according to another aspect of the present disclosure includes: an electric wire; a pipe through which the electric wire is inserted; a seal through which the electric wire is inserted, the seal being configured to ensure sealing of an interior of the pipe by being attached inside the pipe; and a position fixing portion that is provided in the pipe at an intermediate position of the seal with respect to a thickness direction of the seal when the seal is attached in the pipe, the position fixing portion being configured to fix the seal at an attachment position.

According to the present disclosure, it is possible to provide a pipe harness that can have a simplified structure.

DETAILED DESCRIPTION OF EMBODIMENTS

First, embodiments of the present disclosure will be listed and described.

A pipe harness according to an aspect of the present disclosure includes:

[1] an electric wire; a pipe through which the electric wire is inserted; a sealing portion through which the electric wire is inserted, the sealing portion being configured to ensure sealing of an interior of the pipe by being attached inside the pipe; and a position fixing portion that is provided on, out of two sides in a thickness direction of the sealing portion attached in the pipe, at least a pipe opening side of the sealing portion, and that is configured to fix the sealing portion at an attachment position.

According to this configuration, the sealing portion that is to be attached to the pipe is fixed to the pipe by the position fixing portion that is formed integrally with the pipe, and therefore the sealing portion can be fixed to the pipe and/or prevented from coming out of the pipe without using a separate member such as a rubber stopper retainer. Accordingly, the structure of the pipe harness can be simplified.

[2] an electric wire; a pipe through which the electric wire is inserted; a sealing portion through which the electric wire is inserted, the sealing portion being configured to ensure sealing of an interior of the pipe by being attached inside the pipe; and a position fixing portion that is provided in the pipe at a position corresponding to an intermediate portion, with respect to a thickness direction, of the sealing portion attached inside the pipe, and that is configured to fix the sealing portion at an attachment position.

According to this configuration, the sealing portion that is to be attached to the pipe is fixed to the pipe by the position fixing portion that is formed integrally with the pipe, and therefore the sealing portion can be fixed to the pipe and/or prevented from coming out of the pipe without using a separate member such as a rubber stopper retainer. Accordingly, the structure of the pipe harness can be simplified. Also, because the position fixing portion is provided at a position corresponding to the intermediate portion, with respect to the thickness direction, of the sealing portion, the sealing portion can be fixed by the single position fixing portion so as to not be able to move toward both sides in the axial direction of the pipe, which is the thickness direction of the sealing portion.

[3] It is preferable that the position fixing portion is a protruding portion formed by providing an indentation in an outer peripheral surface of the pipe such that an inner peripheral surface of the pipe protrudes. According to this configuration, the position fixing portion can have a simple shape formed by an indentation.

[4] It is preferable that an inner diameter of the protruding portion is set smaller than an outer diameter of the sealing portion. According to this configuration, the sealing portion can be reliably in close contact with the position fixing portion in the pipe axial direction, and thus high sealing performance can be ensured.

[5] It is preferable that the position fixing portion extends completely around the pipe in a circumferential direction. According to this configuration, it is possible to secure a large area of surface contact between the sealing portion and the position fixing portion, thus further contributing to ensuring high sealing performance.

[6] It is preferable that there are a plurality of the position fixing portions, including a first position fixing portion located on an inward side in an axial direction of the pipe and a second position fixing portion located on an outward side in the axial direction of the pipe, and the sealing portion is arranged between the first position fixing portion and the second position fixing portion. According to this configuration, the sealing portion can be arranged so as to be sandwiched between the first position fixing portion and the second position fixing portion, and thus the sealing portion can be reliably fixed in the pipe axial direction.

[7] It is preferable that the first position fixing portion and the second position fixing portion are formed with identical shapes. According to this configuration, both the first position fixing portion and the second position fixing portion can be formed by the same manufacturing method, and thus can be formed easily.

[8] It is preferable that the distance between the first position fixing portion and the second position fixing portion is set equal to or smaller than a thickness of the sealing portion. According to this configuration, the sealing portion can be reliably fixed between the first position fixing portion and the second position fixing portion, thus further contributing to ensuring high sealing performance.

[9] It is preferable that a recessed portion is formed in an outer peripheral surface of the intermediate portion, with respect to the thickness direction, of the sealing portion, the recessed portion being shaped such that the position fixing portion can be fitted therein before attachment inside the pipe. According to this configuration, the position fixing portion is fitted into the recessed portion formed in the outer peripheral surface of the intermediate portion, with respect to the thickness direction, of the sealing portion, and thus the sealing portion can be firmly fixed so as to not be able to move toward both sides in the axial direction of the pipe.

[10] It is preferable that the sealing portion has a constant outer diameter when not subjected to an external force. According to this configuration, the shape of the sealing portion is simplified, and the sealing portion can be manufactured easily.

[11] It is preferable that the pipe is a metal pipe. According to this configuration, a portion of the metal pipe can be used as the position fixing portion, and thus the position fixing portion can be made of metal and have high strength.

DETAILS OF EMBODIMENTS OF PRESENT DISCLOSURE

Specific examples of a pipe harness according to the present disclosure will be described below with reference to the drawings. Note that the present disclosure is not limited to these examples, but rather is indicated by the scope of claims, and is intended to include all modifications within the meaning and scope equivalent to the claims. Portions of configurations may be exaggerated or simplified in the drawings for the sake of convenience in the description. Also, the dimensional ratios of parts may differ from the actual ratios.

Figure 1:
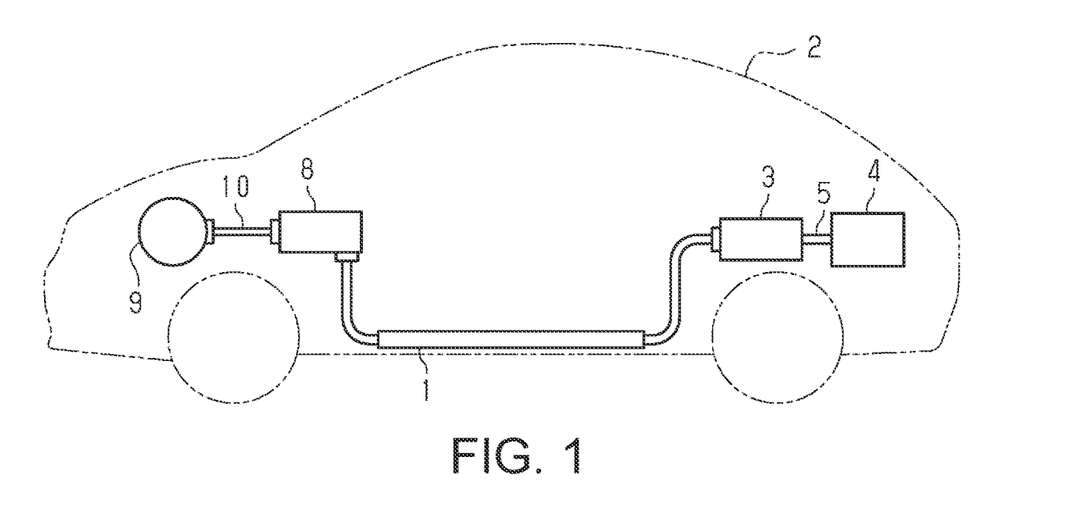
FIG. 1 is a schematic configuration view of a pipe harness according to an embodiment.

As shown in FIG. 1, a pipe harness 1 is provided in a vehicle 2, which is a fuel cell vehicle for example. The vehicle 2 is equipped with a fuel tank 4 for storing fuel for operation of a fuel cell 3. The fuel tank 4 is connected to the fuel cell 3 via a pipe 5, and ethanol, hydrogen, or the like is stored in the fuel tank 4 as fuel. The fuel tank 4 supplies the stored fuel to the fuel cell 3 via the pipe 5. The fuel cell 3 generates electricity by a chemical reaction with the fuel. Note that in the case where ethanol is used as fuel, a reforming device may be provided between the fuel cell 3 and the fuel tank 4 in order to chemically convert ethanol into hydrogen, for example.

The fuel cell 3 is connected to an inverter 8 via the pipe harness 1, which has been attached to the vehicle body. The inverter 8 is connected to a motor 9, which is the traveling drive source of the vehicle 2, via a plurality of wires 10. The inverter 8 converts the voltage generated by the fuel cell 3 into voltage having a predetermined value, and outputs the converted voltage to the motor 9. The motor 9 rotates using the voltage received from the inverter 8 and generates propulsive force for the forward traveling direction of the vehicle 2.

Figure 2:
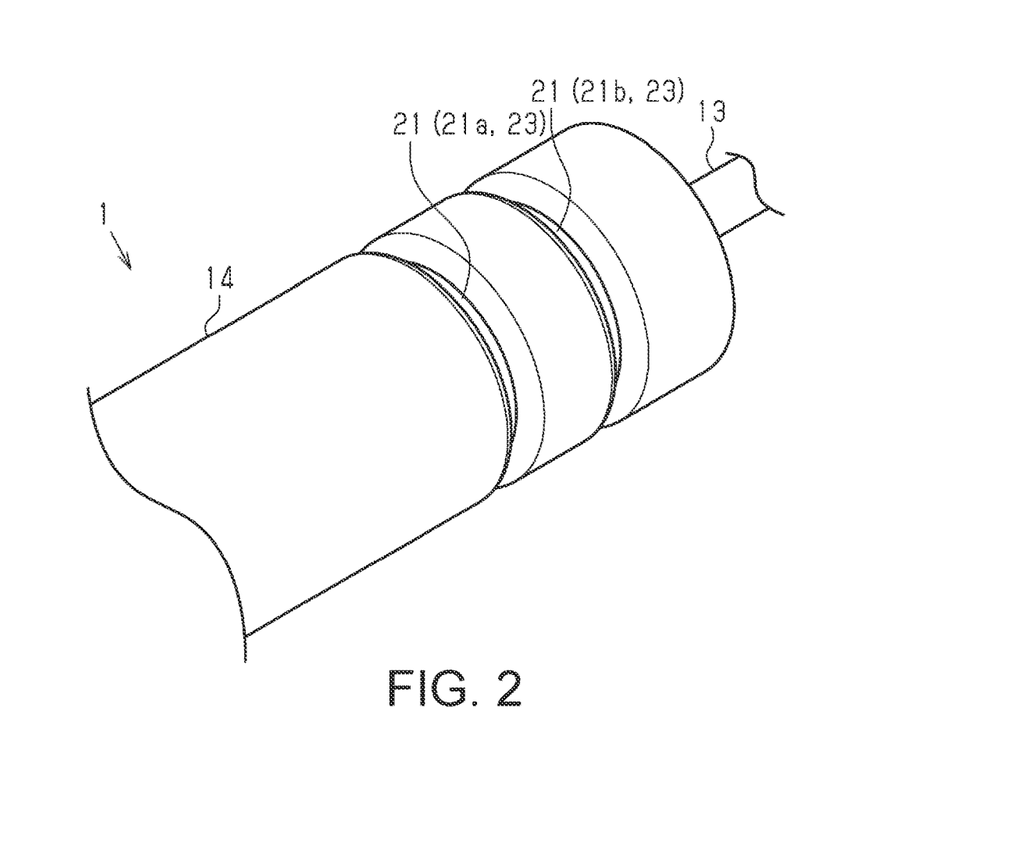
FIG. 2 is a schematic perspective view of an end portion of the pipe harness.

As shown in FIG. 2, the pipe harness 1 includes an electric wire 13 and a pipe 14 into which the electric wire 13 is inserted. The electric wire 13 is housed in the pipe 14, and is exposed from an end portion of the pipe 14. The pipe 14 is preferably a metal pipe, for example, and is formed of a material such as aluminum or copper.

Figure 3:
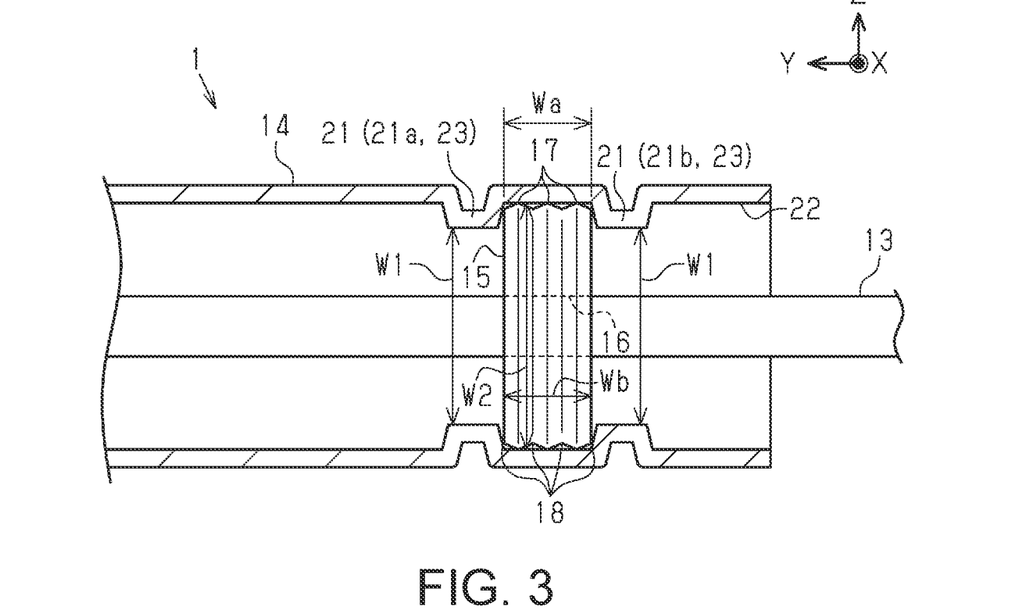
FIG. 3 is a schematic cross-sectional view of an end portion of the pipe harness.

As shown in FIG. 3, the pipe harness 1 includes a sealing portion 15 (seal) for ensuring the sealing of the interior of the pipe 14. The sealing portion 15 is attached to the inside of the pipe 14 while the electric wire 13 is inserted. The electric wire 13 is passed through and in close contact with a hole 16 formed in the sealing portion 15 at the center thereof in the radial direction (the Z direction in FIG. 3). The sealing portion 15 is preferably a rubber stopper, for example. The sealing portion 15 is formed such that the outer periphery has a plurality of large diameter portions 17 and a plurality of small diameter portions 18 that are arranged alternatingly in the thickness direction (the Y direction in FIG. 3).

As shown in FIGS. 2 and 3, the pipe harness 1 includes position fixing portions 21 for fixing the sealing portion 15 at an attachment position in the pipe 14. The position fixing portions 21 are provided at least on a pipe opening 22 side, which is one of two sides in the thickness direction (two sides in the Y-axis direction in FIG. 3) of the sealing portion 15 while attached in the pipe 14. In the case of this example, a pair of position fixing portions 21 are provided on opposite sides of the sealing portion 15 in the thickness direction. The position fixing portions 21 of this example include a first position fixing portion 21a located on the inward side in the axial direction of the pipe 14, and a second position fixing portion 21b located on the outward side in the axial direction of the pipe 14. The sealing portion 15 is arranged between the first position fixing portion 21a and the second position fixing portion 21b.

The position fixing portions 21 are each a protruding portion 23 (protrusion) formed by providing an indentation in the outer peripheral surface of the pipe 14 such that the inner peripheral surface of the pipe 14 protrudes. The position fixing portions 21, that is to say the protruding portions 23, are formed so as to extend completely around the pipe 14 in the circumferential direction. The protruding portion 23 is formed such that an inner diameter W1 thereof is smaller than an outer diameter W2 of the sealing portion 15. The first position fixing portion 21a and the second position fixing portion 21b are formed in the same shape. A distance Wa between the first position fixing portion 21a and the second position fixing portion 21b is set the same as or smaller than a thickness Wb of the sealing portion 15.

Figure 4:
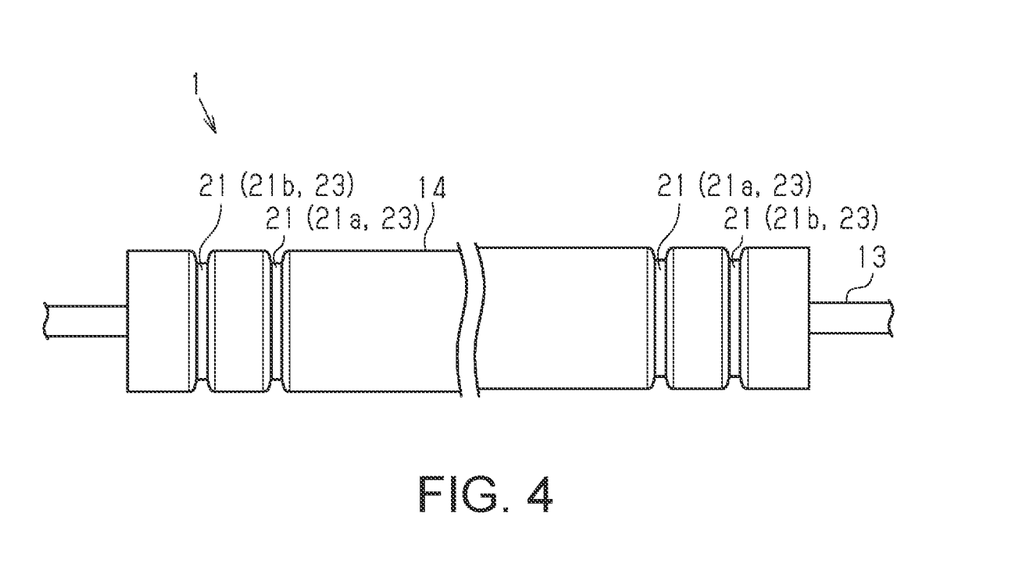
FIG. 4 is an overall schematic side view of the pipe harness.

As shown in FIG. 4, a set of one sealing portion 15 and two position fixing portions 21 is provided at each of the two ends of the pipe 14. In the pipe harness 1, one end of the electric wire 13 is electrically connected to the fuel cell 3 for example, and the other end of the electric wire 13 is electrically connected to the inverter 8 for example.

The following describes operations in the present embodiment.

Figure 5A:
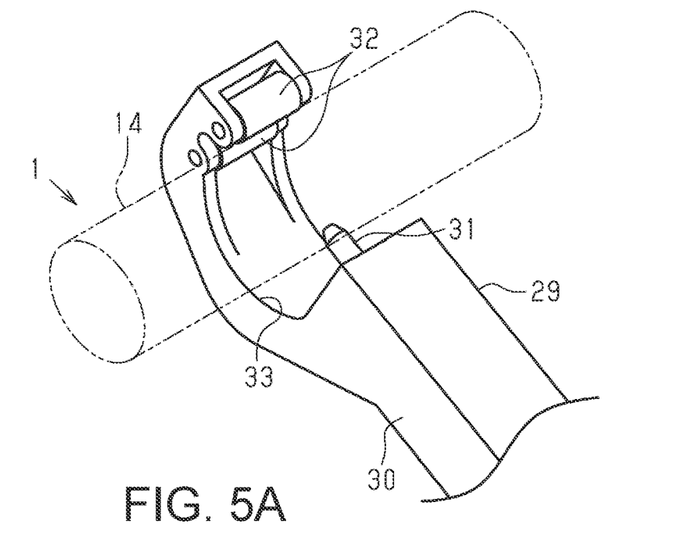
FIGS. 5(a) and 5(b) are manufacturing procedure diagrams showing an overview of first processing.
Figure 5B:
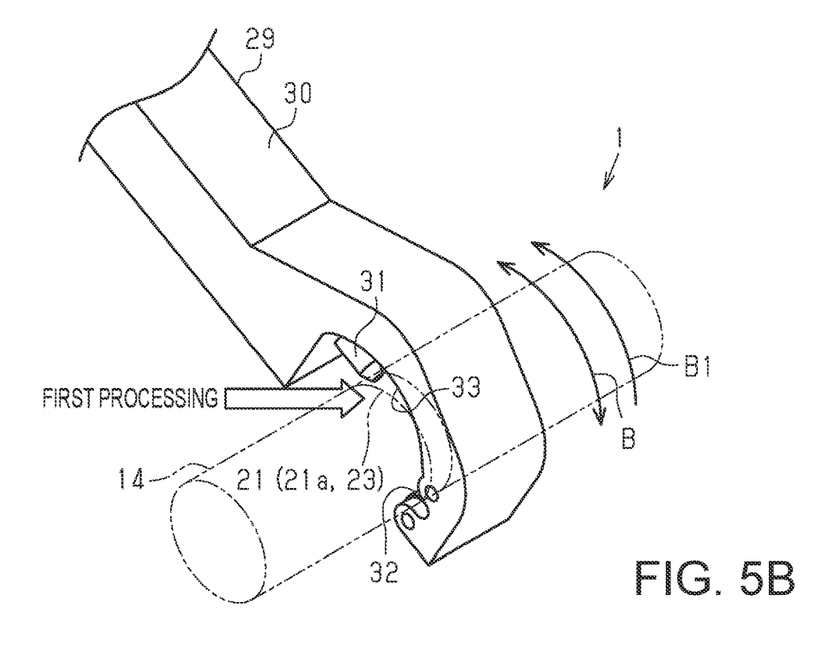

As shown in FIGS. 5(a) and 5(b), a jig 29 capable of forming an indentation in the pipe 14 is used when forming the position fixing portion 21 in the pipe 14. The jig 29 is preferably a tool capable of forming the position fixing portion 21 in the pipe 14 by swaging, for example. The jig 29 of this example includes a jig main body 30, a protrusion 31 for forming an indentation in the outer peripheral surface of the pipe 14, and one or more (two in this example) rollers 32 that guide the rotation the jig 29 around the pipe 14 in the pipe circumferential direction (arrow B direction in FIG. 5(b)). The jig 29 may be either a manual type that is rotated by the operator or an electric type that is automatically rotated by an actuator.

As shown in FIG. 5(a), when the position fixing portion 21 is to be formed in the pipe 14, first, as first processing, the pipe 14 is set in a fitting portion 33 formed as a recession in the jig main body 30, and the protrusion 31 of the jig 29 is positioned at the position where the first position fixing portion 21a is to be formed in the pipe 14. In this setting, the roller 32 comes into contact with the outer peripheral surface of the pipe 14, and the protrusion 31 is strongly pressed against the outer peripheral surface of the pipe 14 at the portion where the first position fixing portion 21a is to be formed.

Then, as shown in FIG. 5(b), after the jig 29 has been set on the pipe 14, the jig 29 is rotated in the circumferential direction of the pipe 14 (arrow B1 direction in FIG. 5(b)) while applying pressure to the outer peripheral surface of the pipe 14 with the protrusion 31, thus forming the recessed first position fixing portion 21a in the pipe 14. The jig 29 may make one full rotation or multiple rotations. In this way, the outer peripheral surface of the pipe 14 is pressed by the protrusion 31 while the jig 29 is rotated, and thus the shape of the pipe 14 is changed in the circumferential direction, and a protruding portion 23 is formed as the first position fixing portion 21a in the pipe 14.

Figure 6A:
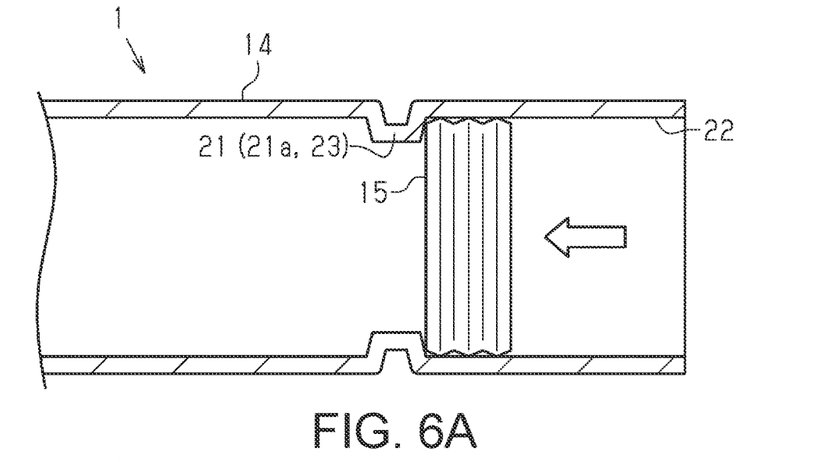
FIGS. 6(a) and 6(b) are illustrative views of a procedure for attaching a sealing portion and an electric wire.

As shown in FIG. 6(a), after the first position fixing portion 21a has been formed in the pipe 14, the sealing portion 15 is attached inside the pipe 14. The sealing portion 15 is attached by being pushed inward up to a position of contact with the first position fixing portion 21a. Also, the sealing portion 15 is attached so as to be in close contact with the inner peripheral surface of the pipe 14.

Figure 6B:
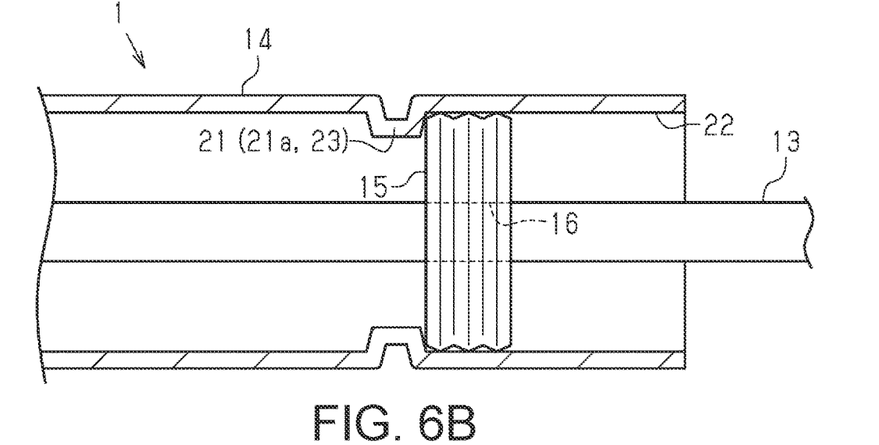

As shown in FIG. 6(b), the electric wire 13 is inserted through the sealing portion 15 that has been attached in the pipe 14. In the case of this example, the electric wire 13 is inserted into the hole 16 formed in the center of the sealing portion 15. It is preferable that the electric wire 13 is attached in a state of being in close contact with the hole 16 of the sealing portion 15 without a gap. There may be one or more electric wires 13, and the sealing portion 15 may have one or more holes 16.

Figure 7:
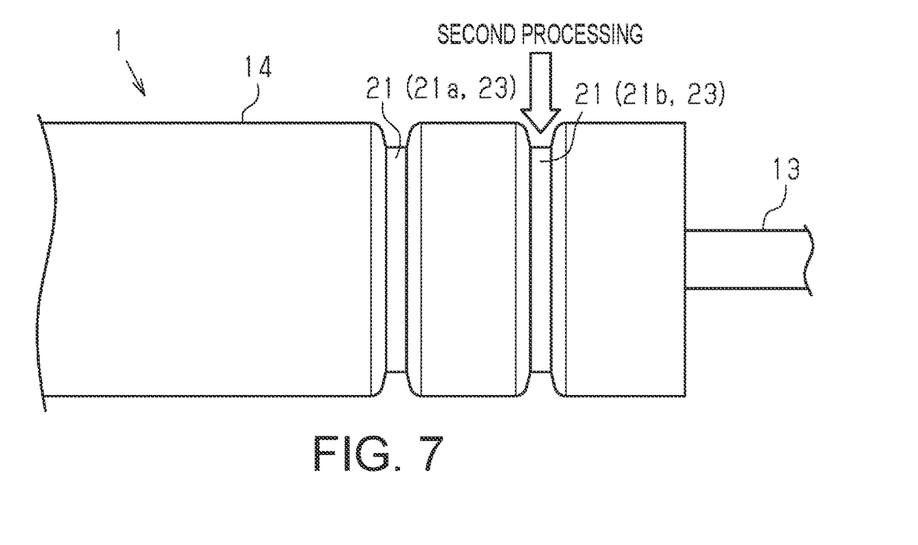
FIG. 7 is an illustrative diagram showing an overview of second processing.

As shown in FIG. 7, after the sealing portion 15 has been attached in the pipe 14, in second processing, the sealing portion 15 is positioned in the pipe 14 by forming the second position fixing portion 21b in the pipe 14. In the case of this example, the second position fixing portion 21b is formed in the pipe 14 by the same method used when forming the first position fixing portion 21a. Note that in the case where the sealing portion 15 is attached at both ends of the pipe 14, the sealing portion 15 is attached and fixed to the other end using the same procedure. As described above, the electric wire 13 and the sealing portion 15 are attached to the pipe 14.

The following describes effects of the present embodiment.

(1) A pipe harness 1 includes: an electric wire 13; a pipe 14 through which the electric wire 13 is inserted; a sealing portion 15 through which the electric wire 13 is inserted, the sealing portion 15 being configured to ensure sealing of an interior of the pipe 14 by being attached inside the pipe 14; and a position fixing portion 21 that is provided on, out of two sides in a thickness direction (Y axis direction in FIG. 3) of the sealing portion 15 attached in the pipe 14, at least a pipe opening 22 side of the sealing portion 15, and that is configured to fix the sealing portion 15 at an attachment position. Note that the thickness direction of the sealing portion 15 is the same as the axial direction of the pipe 14 and/or the length direction of the electric wire 13.

According to the configuration in this example, the sealing portion 15 that is to be attached to the pipe 14 is fixed to the pipe 14 by the position fixing portion 21 that is formed integrally with the pipe 14, and therefore the sealing portion 15 can be fixed to the pipe 14 and/or prevented from coming out of the pipe without using a separate member such as a rubber stopper retainer. Therefore, the structure of the pipe harness 1 can be simplified.

(2) The position fixing portion 21 is a protruding portion 23 formed by providing an indentation in an outer peripheral surface of the pipe 14 such that an inner peripheral surface of the pipe 14 protrudes. Therefore, the position fixing portion 21 can have a simple shape formed by an indentation.

(3) An inner diameter W1 of the protruding portion 23 is set smaller than an outer diameter W2 of the sealing portion 15. Accordingly, the sealing portion 15 can be reliably in close contact with the position fixing portion 21 in a pipe axial direction (Y axis direction in FIG. 3), and thus high sealing performance can be ensured.

(4) The position fixing portion 21 extends completely around the pipe 14 in a circumferential direction. Accordingly, it is possible to secure a large area of surface contact between the sealing portion 15 and the position fixing portion 21, thus further contributing to ensuring high sealing performance.

(5) There are a plurality of position fixing portions 21, including a first position fixing portion 21a located on an inward side in an axial direction of the pipe 14 (depth direction of the pipe 14) and a second position fixing portion 21b located on an outward side in the axial direction of the pipe 14 (closer to an end portion of the pipe 14). The sealing portion 15 is arranged between the first position fixing portion 21a and the second position fixing portion 21b. Accordingly, the sealing portion 15 can be arranged so as to be sandwiched between the first position fixing portion 21a and the second position fixing portion 21b, and thus the sealing portion 15 can be reliably fixed in the pipe axial direction (Y axis direction in FIG. 3).

(6) The first position fixing portion 21a and the second position fixing portion 21b are formed with identical shapes. Accordingly, both the first position fixing portion 21a and the second position fixing portion 21b can be formed by the same manufacturing method, and thus can be formed easily.

(7) A distance Wa between the first position fixing portion 21a and the second position fixing portion 21b is set equal to or smaller than a thickness Wb of the sealing portion 15. Accordingly, the sealing portion 15 can be reliably fixed between the first position fixing portion 21a and the second position fixing portion 21b, thus further contributing to ensuring high sealing performance.

(8) The pipe 14 is a metal pipe. In this case, a portion of the metal pipe can be used as the position fixing portion 21, and thus the position fixing portion 21 can be made of metal and have high strength.

The present embodiment can be implemented with modifications such as the following. The present embodiment and the following modified examples can be implemented in combination with each other as long as no technical contradiction arises.

The shape of the sealing portion 15 is not limited to a shape having a plurality of steps in the thickness direction of the sealing portion 15, and may be any shape that enables sealing the inside of the pipe 14.

The sealing portion 15 can be made of various materials such as a resin.

The sealing portion 15 may be an O-ring.

There is no limitation to a configuration in which two position fixing portions 21 are respectively provided on opposite sides of the sealing portion 15, and it is sufficient that a position fixing portion 21 is arranged on at least the pipe opening 22 side.

The position fixing portion 21 is not limited to extending over the entire circumference in the circumferential direction, and may extend intermittently in the circumferential direction.

The position fixing portion 21 is not limited to having a U-shaped cross-section, and may have any of various shapes such as a tongue piece shape.

The first position fixing portion 21a and the second position fixing portion 21b may have different shapes.

The swaging processing may be performed by, for example, a device that rotates a die and stretches a pipe base material while striking it. Various methods such as cold forging can be used in the swaging processing. Also, there is no limitation to performing molding by swaging, and for example, electromagnetic pulsing may be used to form a shape similar to that of the above embodiment.

The set of one sealing portion 15 and one or more position fixing portions 21 is not limited to being provided at both ends of the pipe harness 1, and may be provided only at one end.

The inner diameter W1 of the protruding portion 23 and the outer diameter W2 of the sealing portion 15 can be appropriately changed to various sizes.

The distance Wa between the first position fixing portion 21a and the second position fixing portion 21b and the thickness Wb of the sealing portion 15 can be appropriately changed to various sizes.

The shape of the pipe 14 is not limited to a cylinder, and may be changed to another shape such as a quadrangular shape.

The material of the pipe 14 is not limited to metal, and may be a resin, for example.

The vehicle 2 is not limited to being a fuel cell vehicle, and may be any of various vehicles such as an engine vehicle, a hybrid vehicle, a plug-in hybrid vehicle, or an electric automobile.

The number of and positions of the position fixing portions 21 and the engagement structure with the sealing portions 15 may be changed.

Figure 8:
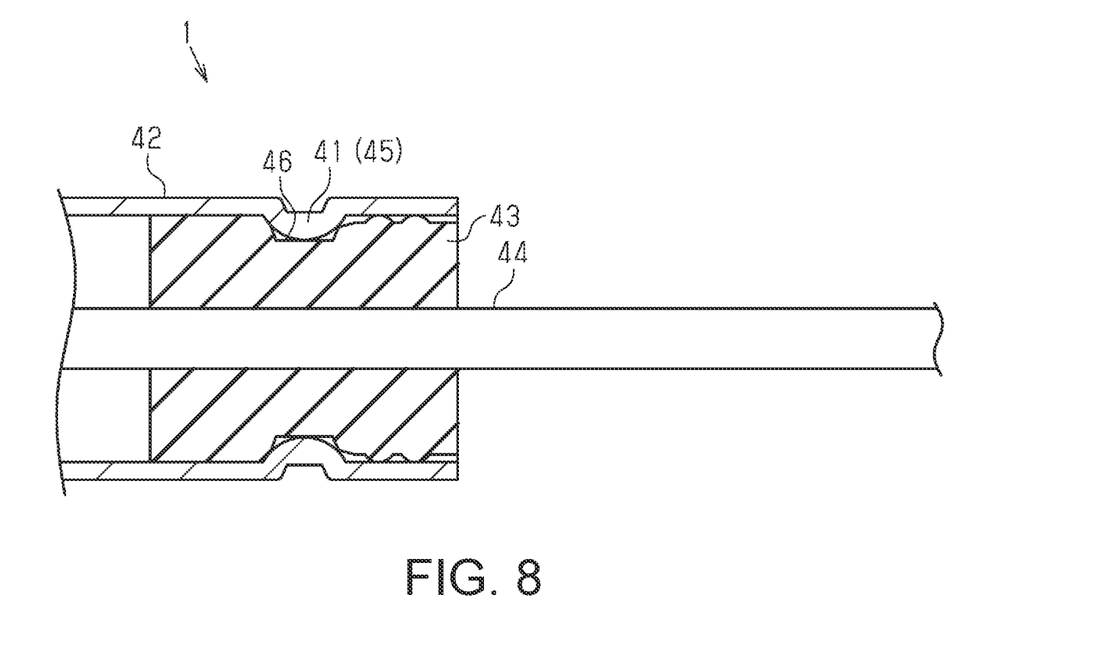
FIG. 8 is a schematic cross-sectional view of an end portion of a pipe harness according to a variation.
Figure 9:
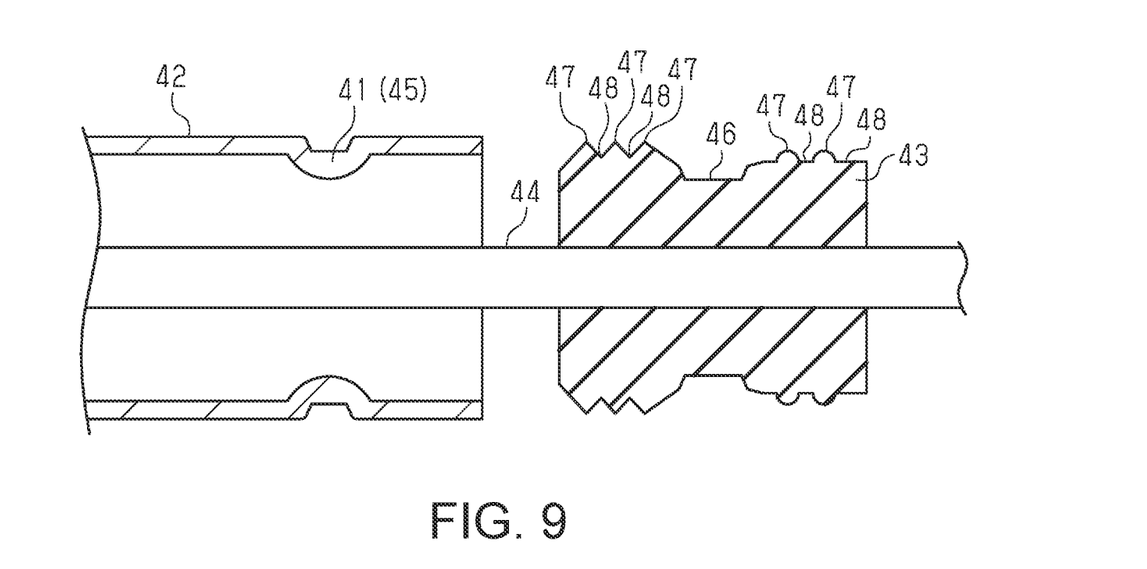
FIG. 9 is a schematic cross-sectional view for illustrating an end portion of a pipe harness according to a variation.

FIGS. 8 and 9 show an example of a variation. Specifically, a position fixing portion 41 in this example is provided in the pipe 42, which may be a metal pipe, at a position corresponding to an intermediate portion (intermediate position), with respect to the thickness direction, of a sealing portion 43 (seal) attached in the pipe 42, thus fixing the sealing portion 43 at an attachment position. Note that the thickness direction of the sealing portion 43 is the same as the axial direction of the pipe 42 and/or the length direction of an electric wire 44.

The position fixing portion 41 in this example is a protruding portion 45 (protrusion) formed by providing an indentation in the outer peripheral surface of the pipe 42 such that the inner peripheral surface of the pipe 42 protrudes, similarly to the position fixing portion 21 of the above embodiment. The position fixing portion 41, that is to say the protruding portions 45, is formed so as to extend completely around the pipe 42 in the circumferential direction. The inner diameter of the protruding portion 45 is set smaller than the outer diameter of the sealing portion 43. Also, the protruding portion 45 has a curved surface shape in which the amount of protrusion thereof changes contiguously in the axial direction of the pipe 42.

As shown in FIG. 9, a recessed portion 46 is formed in the outer peripheral surface of the intermediate portion, with respect to the thickness direction, of the sealing portion 43, the recessed portion 46 being shaped such that the position fixing portion 41 can be fitted therein before attachment inside the pipe 42. Specifically, the sealing portion 43 includes the recessed portion 46 shaped such that the position fixing portion 41 can be fitted therein, due to setting the outer diameter of the intermediate portion in the thickness direction smaller than the outer diameter of the portions on the two sides thereof in the thickness direction. Also, as shown in FIG. 9, before attachment to the inside of the pipe 42, a plurality of large diameter portions 47 and small diameter portions 48 are arranged so as to alternate in the thickness direction on the outer circumferences of the two side portions of the sealing portion 43 in the thickness direction. Furthermore, on the two sides of the sealing portion 43 in the thickness direction, the maximum outer diameter on the inward side of the pipe 42 in the axial direction is larger than that on the outward side of the pipe 42 in the axial direction, and the sealing performance is mainly ensured on the inward side of the pipe 42 in the axial direction.

After the position fixing portion 41 has been formed in the pipe 42, the sealing portion 43 is inserted into the pipe 42 so as to change from the state shown in FIG. 9 to the state shown in FIG. 8, and is fixed due to the position fixing portion 41 being fitted into the recessed portion 46.

With this configuration as well, it is possible to obtain an effect substantially similar to the effect of the above embodiment. Specifically, the sealing portion 43 that is to be attached to the pipe 42 is fixed to the pipe 42 by the position fixing portion 41 that is formed integrally with the pipe 42, and therefore the sealing portion 43 can be fixed to the pipe 42 and/or prevented from coming out of the pipe 42 without using a separate member such as a rubber stopper retainer. Therefore, the structure of the pipe harness 1 can be simplified. Also, because the position fixing portion 41 is provided at a position corresponding to the intermediate portion, with respect to the thickness direction, of the sealing portion 43, the sealing portion 43 can be fixed by the single position fixing portion 41 so as to not be able to move toward both sides in the axial direction of the pipe 42, which is the thickness direction of the sealing portion 43.

Also, the recessed portion 46 shaped such that the position fixing portion 41 is fitted therein is formed in the outer peripheral surface of the intermediate portion, with respect to the thickness direction, of the sealing portion 43 before attachment to the inside of the pipe 42, that is to say in the standalone state. With this configuration, the position fixing portion 41 is fitted into the recessed portion 46, and thus the sealing portion 43 can be firmly fixed so as to not be able to move toward both sides in the axial direction of the pipe 42.

Figure 10:
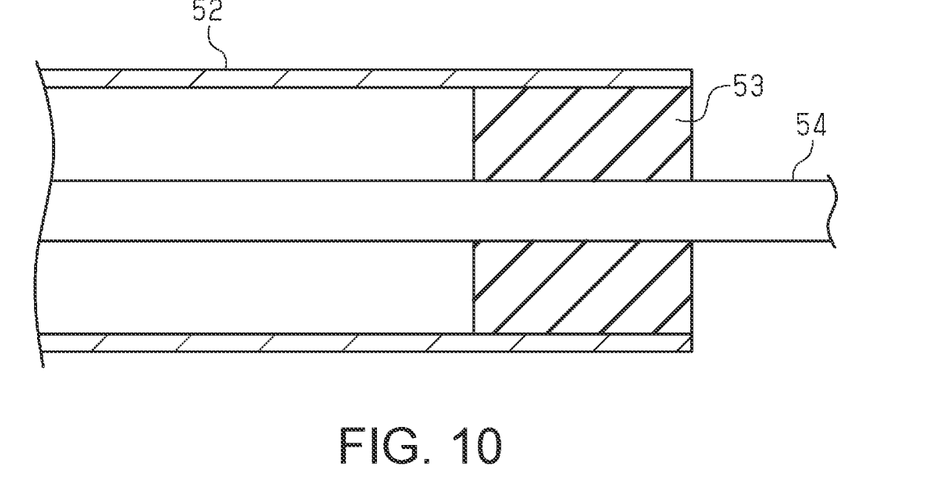
FIG. 10 is a schematic cross-sectional view for illustrating an end portion of a pipe harness according to a variation.
Figure 11:
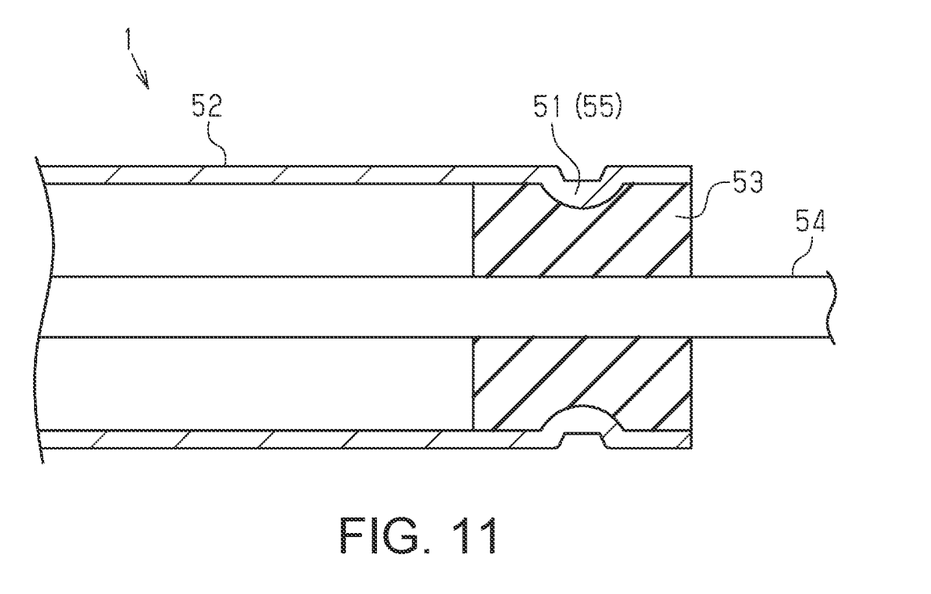
FIG. 11 is a schematic cross-sectional view of an end portion of a pipe harness according to a variation.

FIGS. 10 and 11 show another example of a variation. Specifically, a position fixing portion 51 (see FIG. 11) in this example is provided at a position corresponding to an intermediate portion, with respect to the thickness direction, of a sealing portion 53 attached in a pipe 52, which may be a metal pipe, thus fixing the sealing portion 53 at an attachment position. Note that the thickness direction of the sealing portion 53 is the same as the axial direction of the pipe 52 and/or the length direction of an electric wire 54.

The position fixing portion 51 in this example is a protruding portion 55 formed by providing an indentation in the outer peripheral surface of the pipe 52 such that the inner peripheral surface of the pipe 52 protrudes, similarly to the position fixing portion 21 of the above embodiment. The position fixing portion 51, that is to say the protruding portion 55, is formed so as to extend completely around the pipe 52 in the circumferential direction. The inner diameter of the protruding portion 55 is set smaller than the outer diameter of the sealing portion 53.

The outer diameter of the sealing portion 53 has a constant outer diameter when not subjected to an external force. In other words, the sealing portion 53 in this example has a cylindrical shape when not subjected to an external force. As shown in FIG. 10, the sealing portion 53 is inserted into the pipe 52 before the position fixing portion 51 (see FIG. 11) is formed in the pipe 52, and then, as shown in FIG. 11, the position fixing portion 51 is formed, and thus the intermediate portion in the thickness direction is compressed and fixed. In this configuration, the sealing performance is mainly ensured at the intermediate portion in the thickness direction of the compressed sealing portion 53.

With this configuration as well, it is possible to obtain an effect substantially similar to the effect of the above embodiment. Specifically, the sealing portion 53 that is to be attached to the pipe 52 is fixed to the pipe 52 by the position fixing portion 51 that is formed integrally with the pipe 52, and therefore the sealing portion 53 can be fixed to the pipe 52 and/or prevented from coming out of the pipe 52 without using a separate member such as a rubber stopper retainer. Therefore, the structure of the pipe harness 1 can be simplified. Also, because the position fixing portion 51 is provided at a position corresponding to the intermediate portion, with respect to the thickness direction, of the sealing portion 53, the sealing portion 53 can be fixed by the single position fixing portion 51 so as to be able to move toward both sides in the axial direction of the pipe 52, which is the thickness direction of the sealing portion 53.

Also, because the sealing portion 53 has a constant outer diameter when not subjected to an external force, the shape of the sealing portion 53 is simplified, and the sealing portion 53 can be manufactured easily. Note that the sealing portion 53 may be formed such that the outer peripheral surface thereof has a plurality of large diameter portions and small diameter portions that are arranged alternatingly in the thickness direction.

In the example shown in FIG. 3, the position fixing portion 21 (21*a*, 21*b*, 23) may be referred to as a reduced diameter portion of the pipe 14. The projecting portion 23 may be referred to as a radial inward protruding portion. The inner diameter W1 of the position fixing portion 21 (21*a*, 21*b*, 23) may be referred to as the inner diameter of the reduced diameter portion of the pipe 14, or may be the minimum inner diameter of the pipe 14. The outer diameter of the position fixing portion 21 (21*a*, 21*b*, 23) may be referred to as the outer diameter of the reduced diameter portion of the pipe 14, or may be the minimum outer diameter of the pipe 14. The pipe 14 may have a constant inner diameter and a constant outer diameter in the region excluding the position fixing portion 21 (21*a*, 21*b*, 23). The position fixing portion 21 (21*a*, 21*b*, 23) may be a portion of the pipe wall of the pipe 14 or may be seamlessly continuous with the pipe wall, and the position fixing portion 21 (21*a*, 21*b*, 23) and the pipe 14 may be made of the same material. This similarly applies to the components of the examples in FIGS. 8, 9, and 11 that correspond to the components of the example in FIG. 3.

In the example of FIG. 3, the first position fixing portion 21*a* of the pipe 14 may be referred to as a first stopper located at a first axial position separated from the pipe opening 22 by a first axial distance in the length direction of the pipe 14. The second position fixing portion 21*b* of the pipe 14 may be referred to as a second stopper located at a second axial position separated from the pipe opening 22 by a second axial distance that is shorter than the first axial distance in the length direction of the pipe 14. The first stopper may be an annular protrusion that projects radially inward from the inner peripheral surface of the pipe 14 and has a radial inward surface. The first stopper may have a stopper surface which may be an annular stepped surface that extends between the inner peripheral surface of the pipe 14 and the radial inward surface of the first stopper. The second stopper may have the same structure as the first stopper. The axial inward end face of the sealing portion 15, which may be annular or cylindrical, comes into direct contact with the stopper surface of the first stopper, and thus the first stopper suppresses movement of the sealing portion 15 toward the back of the pipe 14. The radial outward end face of the sealing portion 15, which may be annular or cylindrical, comes into direct contact with the stopper surface of the second stopper, and thus the second stopper suppresses movement of the sealing portion 15 toward the pipe opening 22, and thereby suppresses the case where the sealing portion 15 comes out of the pipe 14. It is sufficient that the separation distance between the stopper surface of the first stopper and the stopper surface of the second stopper is set to a distance that is the same as or corresponds to the thickness of the sealing portion 15 that may be annular or cylindrical (i.e., the distance from the axial inward end face of the sealing portion 15 to the axial outward end face of the sealing portion 15).

The invention claimed is:

1. A pipe harness comprising:
   an electric wire;
   a pipe through which the electric wire is inserted;
   a seal through which the electric wire is inserted, the seal being configured to ensure sealing of an interior of the pipe by being attached inside the pipe;

a first position fixing portion that is on at least a pipe opening side of the seal out of two sides of the seal in a thickness direction of the seal when the seal is attached in the pipe, the first position fixing portion being configured to fix the seal at an attachment position; and a second position fixing portion located on a second side of the seal opposite the pipe opening side of the seal, wherein a face on the second side of the seal abuts the second position fixing portion.

2. A pipe harness comprising:

an electric wire;

a pipe through which the electric wire is inserted;

a seal through which the electric wire is inserted, the seal being configured to ensure sealing of an interior of the pipe by being attached inside the pipe; and a position fixing portion that is in the pipe at an intermediate position of the seal with respect to a thickness direction of the seal when the seal is attached in the pipe, the position fixing portion being configured to fix the seal at an attachment position, wherein a first maximum outer diameter on an inward side in an axial direction of the seal is greater than a second maximum outer diameter on an outward side in the axial direction of the seal, and a third maximum outer diameter between the first maximum outer diameter and the second maximum outer diameter in the axial direction is smaller than the second maximum outer diameter.

3. The pipe harness according to claim 1, wherein the first position fixing portion is a protrusion formed by an indentation in an outer peripheral surface of the pipe such that an inner peripheral surface of the pipe protrudes.

4. The pipe harness according to claim 3, wherein an inner diameter of the protrusion is smaller than an outer diameter of the seal.

5. The pipe harness according to claim 1, wherein the first position fixing portion extends completely around the pipe in a circumferential direction of the pipe.

6. The pipe harness according to claim 1, wherein:

the first position fixing portion is on the pipe opening side of the seal, and the seal is between the first position fixing portion and the second position fixing portion.

7. The pipe harness according to claim 6, wherein the first position fixing portion and the second position fixing portion have identical shapes.

8. The pipe harness according to claim 6, wherein the distance between the first position fixing portion and the second position fixing portion is equal to or smaller than a thickness of the seal.

9. The pipe harness according to claim 2, wherein a recess is in an outer peripheral surface of the intermediate position with respect to the thickness direction of the seal, the recess being shaped such that the position fixing portion can be fitted therein before attachment inside the pipe.

10. The pipe harness according to claim 2, wherein the seal has a constant outer diameter when not subjected to an external force.

11. The pipe harness according to claim 1, wherein the pipe is a metal pipe.

\* \* \* \* \*